(12) United States Patent
Pasternack et al.

(10) Patent No.: US 11,334,714 B2
(45) Date of Patent: May 17, 2022

(54) GENERATING DIVERSE SMART REPLIES USING SYNONYM HIERARCHY

(71) Applicant: Microsoft Technology Licensing, LLC, Redmond, WA (US)

(72) Inventors: Jeffrey William Pasternack, Fremont, CA (US); Arpit Dhariwal, San Francisco, CA (US); Bing Zhao, San Jose, CA (US); Nimesh Madhavan Chakravarthi, San Francisco, CA (US); Nandeesh Channabasappa Rajashekar, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/352,978

(22) Filed: Jun. 21, 2021

(65) Prior Publication Data
US 2021/0312126 A1 Oct. 7, 2021

Related U.S. Application Data

(63) Continuation of application No. 16/020,148, filed on Jun. 27, 2018, now Pat. No. 11,062,084.

(51) Int. Cl.
*G06F 40/247* (2020.01)
*G06F 16/22* (2019.01)
(Continued)

(52) U.S. Cl.
CPC ......... *G06F 40/247* (2020.01); *G06F 3/0482* (2013.01); *G06F 16/2246* (2019.01); *H04W 4/12* (2013.01)

(58) Field of Classification Search
CPC .. G06F 40/247; G06F 16/2246; G06F 3/0482; H04W 4/12
(Continued)

(56) References Cited

U.S. PATENT DOCUMENTS

| 2003/0120732 A1 | 6/2003 | Couts et al. |
| 2008/0152231 A1 | 6/2008 | Gokturk et al. |

(Continued)

FOREIGN PATENT DOCUMENTS

| CN | 104620240 A | 5/2015 |
| CN | 107870974 A | 4/2018 |
| JP | 2016212860 A | 12/2016 |

OTHER PUBLICATIONS

"Non Final Office Action Issued in U.S. Appl. No. 16/019,925", dated May 28, 2021, 17 Pages.
(Continued)

*Primary Examiner* — William D Titcomb
(74) *Attorney, Agent, or Firm* — Schwegman Lundberg & Woessner, P.A.

(57) ABSTRACT

Techniques for generating diverse smart replies using a synonym hierarchy are disclosed herein. A computer system may detect that a first set of one or more messages having first content has been transmitted from a first computing device of a first user to a second computing device of a second user, determine a plurality of candidate replies based on the first content of the first set of one or more messages, and then select a plurality of smart replies from the plurality of candidate replies using a hierarchical graph data structure and at least one diversity rule. The selecting of the plurality of smart replies comprises omitting at least one of the plurality of candidate replies from selection based on the at least one diversity rule, which limits a number of the plurality of smart replies that have a common parent node.

20 Claims, 13 Drawing Sheets

(51) Int. Cl.
*G06F 3/0482* (2013.01)
*H04W 4/12* (2009.01)
(58) Field of Classification Search
USPC ......................................................... 715/252
See application file for complete search history.

(56) References Cited

U.S. PATENT DOCUMENTS

2014/0365915 A1   12/2014  Baek
2016/0328147 A1   11/2016  Zhang et al.
2018/0039406 A1    2/2018  Kong et al.
2018/0278553 A1    9/2018  Yu et al.

OTHER PUBLICATIONS

"Non Final Office Action Issued in U.S. Appl. No. 16/020,167", dated Mar. 10, 2021, 23 Pages.
"Non Final Office Action Issued in U.S. Appl. No. 16/019,925", dated Dec. 13, 2021, 14 Pages.
"First Office Action and Search Report Issued in Chinese Patent Application No. 201980043498.0", dated Dec. 28, 2021, 19 Pages.

GENERATING DIVERSE SMART REPLIES USING SYNONYM HIERARCHY

CROSS-REFERENCE TO RELATED APPLICATIONS

This application is a continuation of prior application Ser. No. 16/020,148, filed on Jun. 27, 2018, which is incorporated by reference herein in its entirety.

TECHNICAL FIELD

The present application relates generally to systems, methods, and computer program products for reducing the consumption of electronic resources in generating diverse smart replies for a user using synonym hierarchy graphs.

BACKGROUND

Generating suggested replies to messages can drain electronic resources by placing a heavy load of computational expense on the computer system that is generating the suggested replies. In attempting to provide users with the most relevant and useful suggested replies, the computer system may have to evaluate a vast number of parameters for a model and may require a large amount of training data for each and every user. Additionally, available space on a display screen can be limited, particularly with display screens of mobile devices. Computer systems may waste this importance space on the display screen by displaying an excessive number of redundant smart replies. Other technical problems may arise as well.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
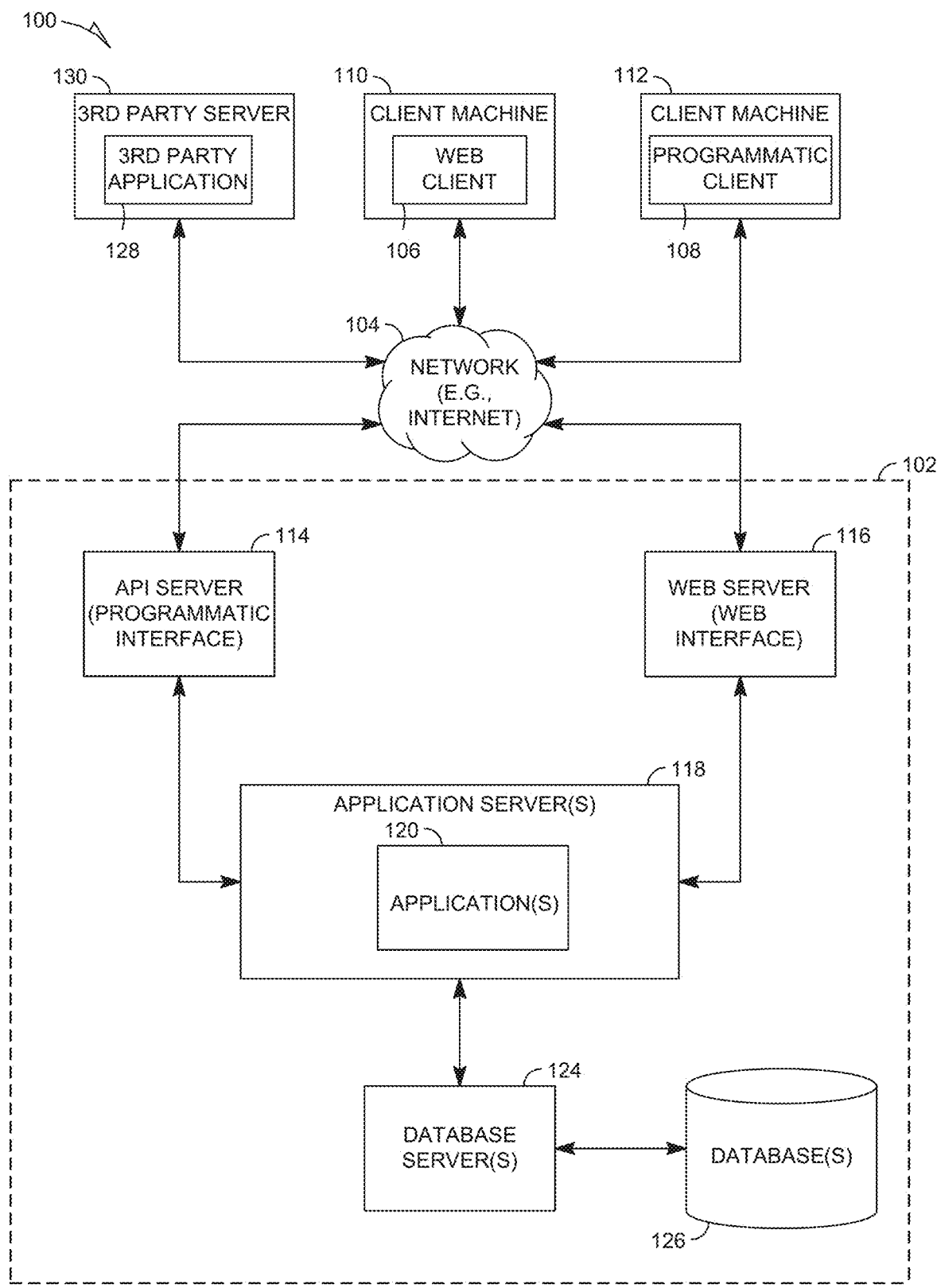
FIG. 1 is a block diagram illustrating a client-server system, in accordance with an example embodiment.

Example methods and systems of generating diverse smart replies for a user using synonym hierarchy graphs are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. Some technical effects of the system and method of the present disclosure are to reducing the consumption of electronic resources in generating diverse smart replies for a user. Additionally, other technical effects will be apparent from this disclosure as well.

In some example embodiments, operations are performed by a computer system (or other machine) having a memory and at least one hardware processor, with the operations comprising: detecting that a first set of one or more messages having first content has been transmitted from a first computing device of a first user to a second computing device of a second user; determining a plurality of candidate replies based on the first content of the first set of one or more messages; selecting a plurality of smart replies from the plurality of candidate replies using a hierarchical graph data structure and at least one diversity rule, the hierarchical graph data structure comprising a tree of concepts ranging from a root node to a plurality of leaf nodes with at least one intermediate node in between the root node and each one of the plurality of leaf nodes, each one of the plurality of smart replies being represented by a corresponding one of the plurality of leaf nodes in the hierarchical graph data structure, the selecting the plurality of smart replies comprising omitting at least one of the plurality of candidate replies from selection to be included in the plurality of smart replies based on the at least one diversity rule, the at least one diversity rule limiting a number of the plurality of smart replies that have a common parent node; and causing each one of the selected plurality of smart replies to be displayed on the second computing device of the second user as a corresponding selectable user interface element.

In some example embodiments, the operations further comprise: receiving a user selection of one of the plurality of smart replies from the second computing device; and transmitting a second message including the selected one of the plurality of smart replies to the first computing device in response to the receiving of the user selection.

In some example embodiments, the operations further comprise: selecting a plurality of smart follow-up content from a plurality of candidate follow-up content in response to the transmitting of the second message including the selected one of the plurality of smart replies to the first computing device, the selecting of the plurality of smart follow-up content being based on at least one of the selected one of the plurality of smart replies and the first content of the first set of one or more messages; and causing each one of the selected plurality of smart follow-up content to be displayed on the second computing device of the second user as a corresponding selectable user interface element.

In some example embodiments, the selecting of the plurality of smart follow-up content comprises: determining the plurality of candidate follow-up content based on at least one of the selected one of the plurality of smart replies and the first content of the first set of one or more messages; and selecting the plurality of smart follow-up content from the plurality of candidate follow-up content using the hierarchical graph data structure and the at least one diversity rule, each one of the plurality of smart follow-up content being represented by a corresponding one of the plurality of leaf nodes in the hierarchical graph data structure, the selecting of the plurality of smart follow-up content comprising omitting at least one of the plurality of candidate follow-up content from selection to be included in the plurality of smart follow-up content based on the at least one diversity rule, the at least one diversity rule limiting a number of the plurality of smart follow-up content that have a common parent node.

In some example embodiments, the operations further comprise: receiving another user selection of one of the plurality of smart follow-up content from the second computing device; and transmitting a third message including the selected one of the plurality of smart follow-up content to the first computing device in response to the receiving of the other user selection.

In some example embodiments, the first content of the first set of one or more messages comprises text. In some example embodiments, each one of the plurality of smart replies comprises text.

In some example embodiments, the computer system comprises a remote server. In some example embodiments, the computer system comprises the second computing device.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
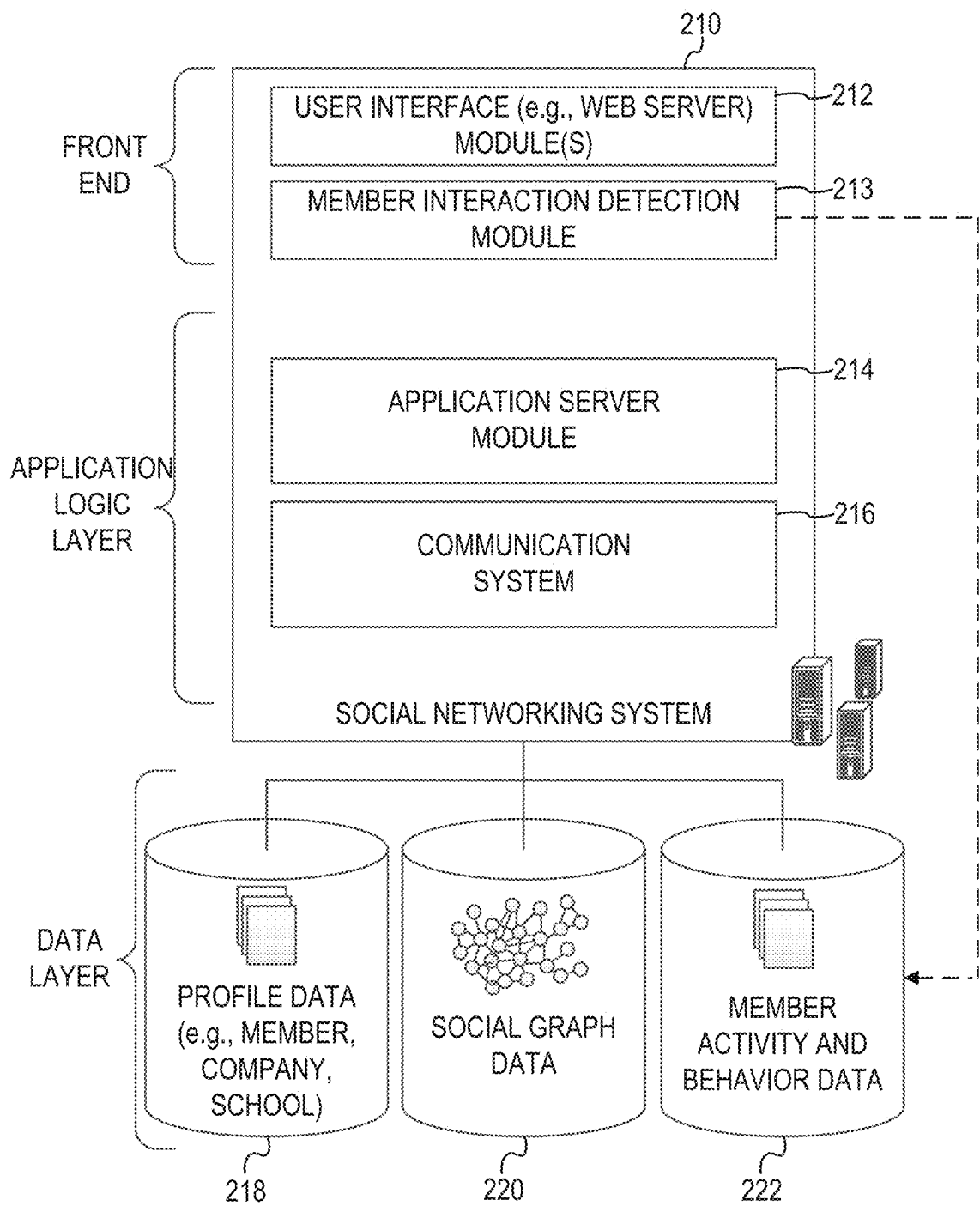
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a communication system 216, for use in social networking system 210, consistent with some embodiments of the present disclosure. In some embodiments, the communication system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the communication system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile. Additionally, one or more profile images (e.g., photos of the member) may be stored in the database 218.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the communication system 216. The members' interactions and behavior may also be tracked, stored, and used by a pre-fetch system 400 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the communication system 216 is referred to herein as being used in the context of a social networking service, it is contemplated that it may also be employed in the context of any website or online services. Additionally, features of the present disclosure can be used or presented in the context of a web page or any other user interface view, including, but not limited to, a user interface on a mobile device or on desktop software.

In some example embodiments, the communication system 216 is configured to generate a diverse set of smart replies for a user using a synonym hierarchy graph and at least one diversity rule that limits the number of smart replies that have a common parent node or that have some other common relationship with a particular node. A smart reply is a suggested reply that is automatically generated by the communication system 216 and presented to a user in response to, or otherwise based on, a message sent to the user from another user (e.g., a text message transmitted from a first device of a first user to a second device of a second user).

Figure 3:
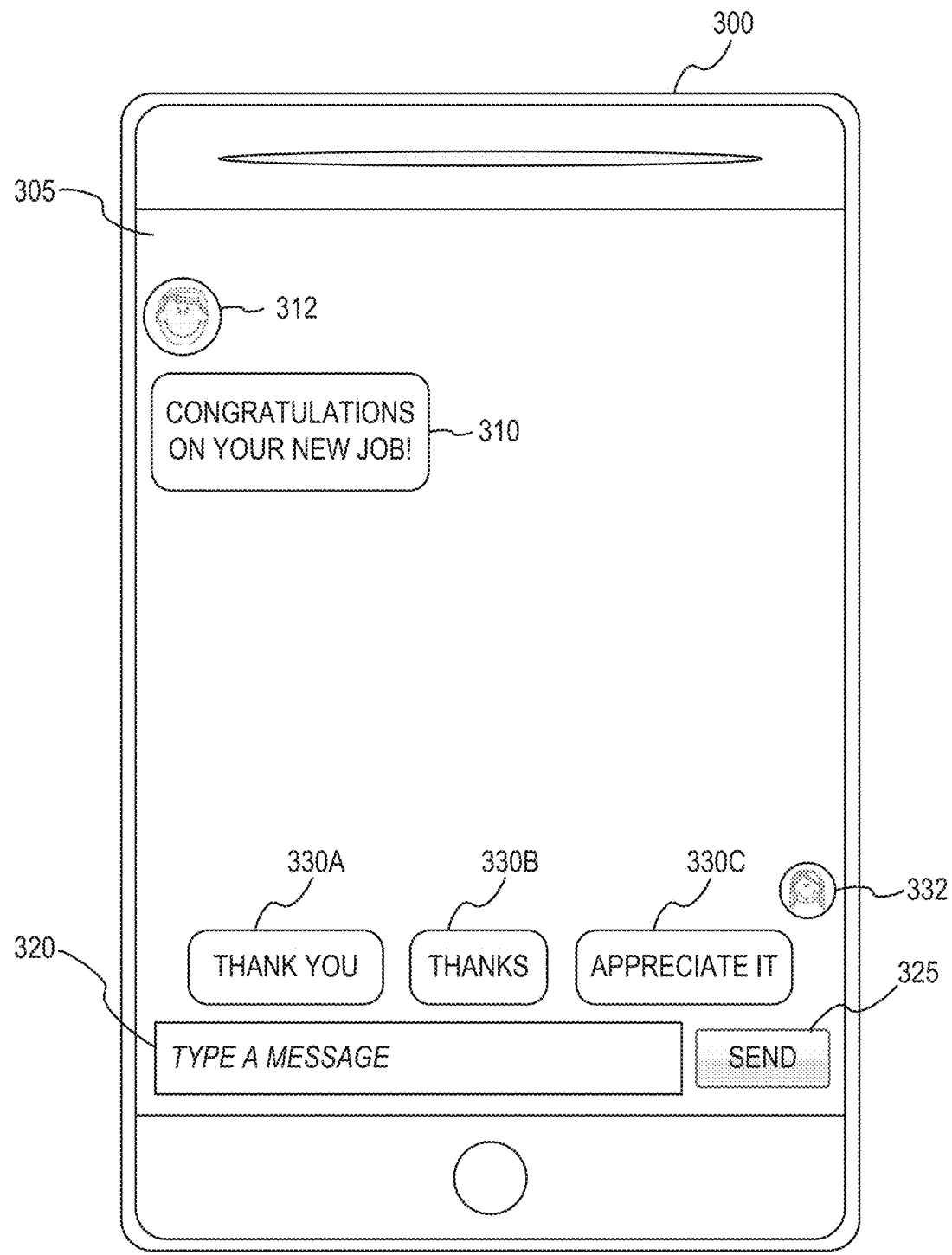
FIG. 3 illustrates generated smart replies being displayed as selectable options for replying to messages within a graphical user interface (GUI) on a display screen of a mobile device, in accordance with an example embodiment.

FIG. 3 illustrates generated smart replies 330 being displayed as selectable options for replying to messages 310 within a graphical user interface (GUI) on a display screen 305 of a mobile device 300, in accordance with an example embodiment. In FIG. 3, a first user, represented on the display screen 305 by icon 312 (e.g., a profile image of the first user), has sent a message 310 to a second user, represented in the display screen 305 by icon 332 (e.g., a profile image of the second user). Although the example conversations provided herein involve a first user and a second user, in some example embodiments, the conversations involve more than two users, such as with group conversations where three or more users are included in the same conversation thread. The GUI provides a content entry field 320 configured to receive user-entered content (e.g., text, image) to be included in a reply message to the first user. The GUI also provides a selectable user interface element 325 configured to trigger the transmission of the input received via the content entry field 320 to the first user.

Figure 4:
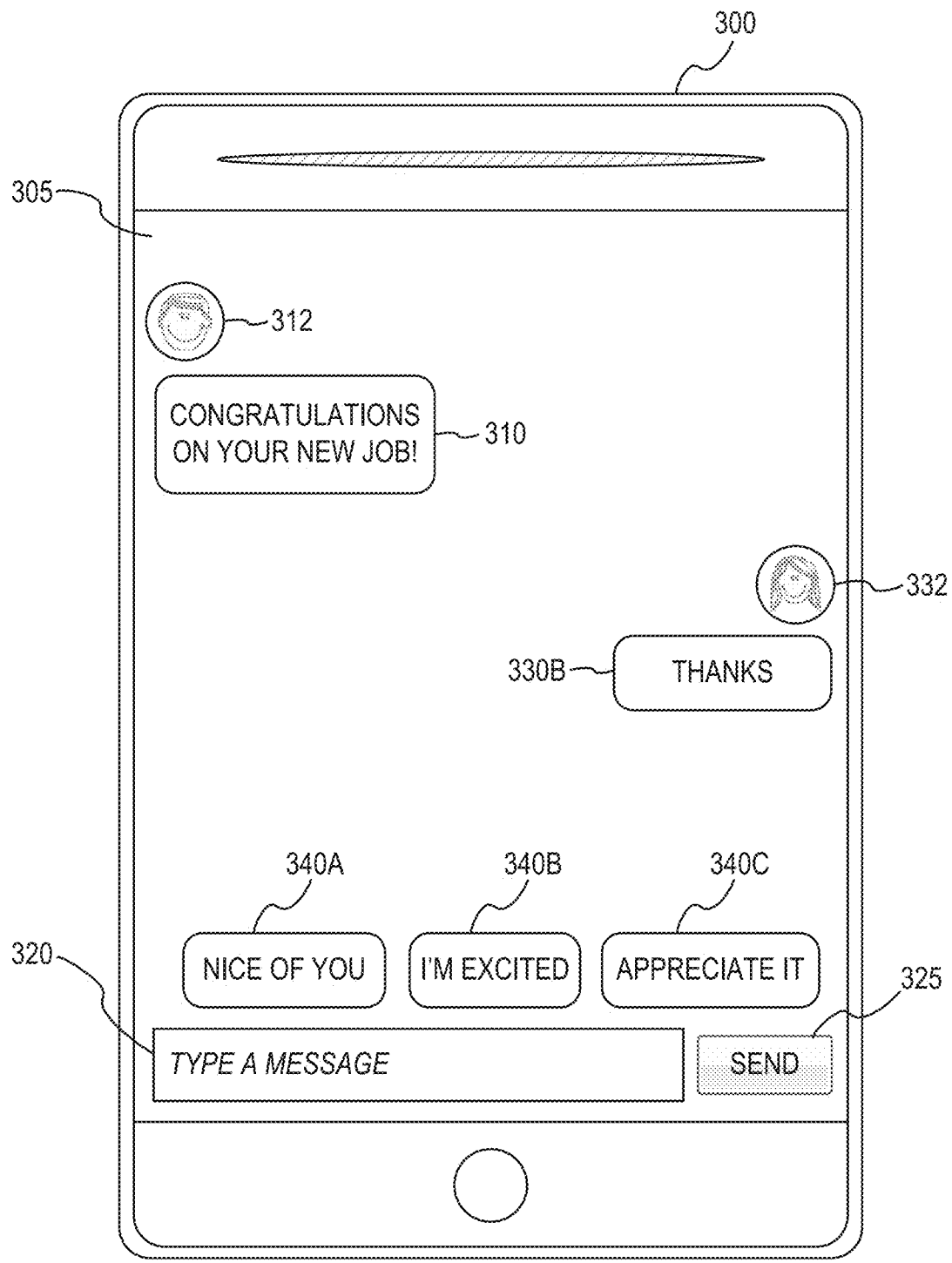
FIG. 4 illustrates a result of one of the generated smart replies being selected, in accordance with an example embodiment.

In FIG. 3, the communication system 216 has generated smart replies 330A, 330B, and 330C based on the content of one or more of the messages 310. In some example embodiments, the smart replies 330A, 330B, and 330C are each displayed as a selectable user interface element that the second user may select to include as part of a reply message to the first user. For example, each one of the smart replies 330A, 330B, and 330C may comprise a selectable user interface element configured to, in response to a user selection of the smart reply 330 via the corresponding selectable user interface element, transmit a reply message including the selected smart reply 330 to the computing device of the first user. FIG. 4 illustrates a result of one of the generated smart replies 330 being selected by the second user, in accordance with an example embodiment. In FIG. 4, the second user has selected (e.g., clicked on, tapped) the corresponding selectable user interface element of smart reply 330B in FIG. 3. In response to this user selection of the corresponding selectable user interface element of smart reply 330B, the communication system 216 has transmitted a reply message including the selected smart reply 330B to the computing device of the first user, as shown by the smart reply 330B being displayed as part of a conversation between the first user and the second user within the GUI on the display screen 305.

In some example embodiments, the communication system 216 generates and displays a plurality of smart follow-up content 340 in response to the selection of one of the smart replies 330 or in response to the transmission of the second message including the selected smart reply 330 to the first computing device. The plurality of smart follow-up content 340 may be determined based on at least one of the selected smart reply 330 and the content of the message 310 from the first computing device.

In FIG. 4, the communication system 216 has generated smart follow-up contents 340A, 340B, and 340C based on any combination of one or more of the selected smart reply 330B and the content of the message 310 from the first computing device. In some example embodiments, the smart follow-up contents 340A, 340B, and 340C are each displayed as a corresponding selectable user interface element that the second user may select to include as part of a follow-up message to their preceding message that included the selected smart reply 330B. For example, each one of the smart follow-up contents 340A, 340B, and 340C may comprise a selectable user interface element configured to, in response to a user selection of the smart follow-up content 340 via the corresponding selectable user interface element, transmit a follow-up message including the selected smart follow-up content 340 to the computing device of the first user.

Figure 5:
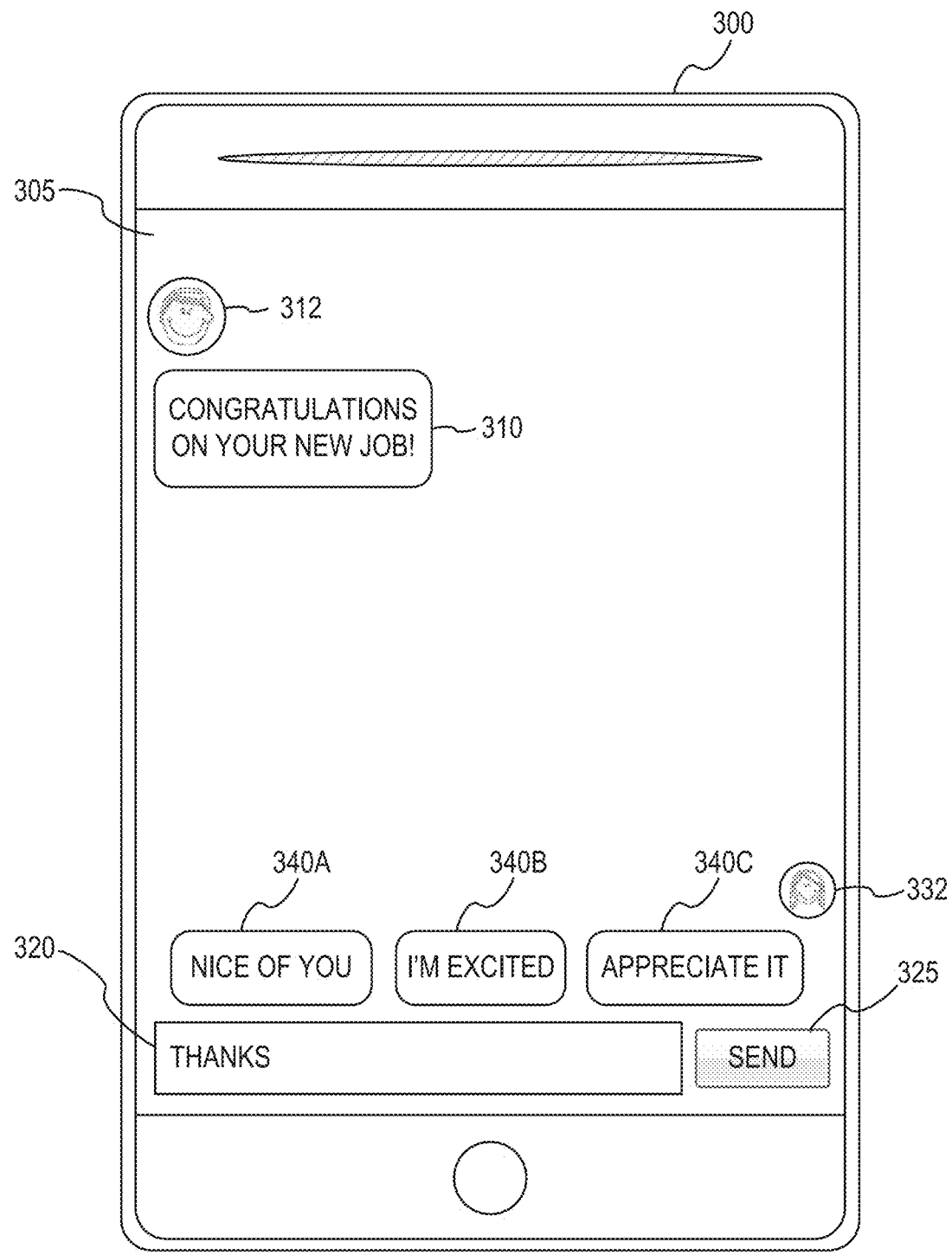
FIG. 5 illustrates another result of one of the generated smart replies being selected, in accordance with an example embodiment.

In some example embodiments, each selectable user interface element corresponding to one of the smart replies 330 is configured to, in response to a user selection of the smart reply 330 via the corresponding selectable user interface element, insert the selected smart reply 330 into the content entry field 320, where the second user may then provide an instruction to transmit a reply message including the selected smart reply 330 and any other user-entered content in the content entry field 320 to the first user. FIG. 5 illustrates another result of one of the generated smart replies 330 being selected, in accordance with an example embodiment. In FIG. 5, the second user has selected (e.g., clicked on, tapped) the corresponding selectable user interface element of smart reply 330B in FIG. 3. In response to this user selection of the corresponding selectable user interface element of smart reply 330B, the communication system 216 has inserted the selected smart reply 330B into the content entry field 320, but not yet transmitted a reply message including the selected smart reply 330B to the first user. Here, the second user has an opportunity to enter additional content (e.g., text, images) into the content entry field 320 for inclusion along with the selected smart reply 330B in the reply message or to edit (e.g., delete portions of) the selected smart reply 330B in the content entry field 320 before transmitting the reply message. When the second user is ready to send the content within content entry field 320 as a reply message to the first user, the second user selects the user interface element 325.

Figure 6:
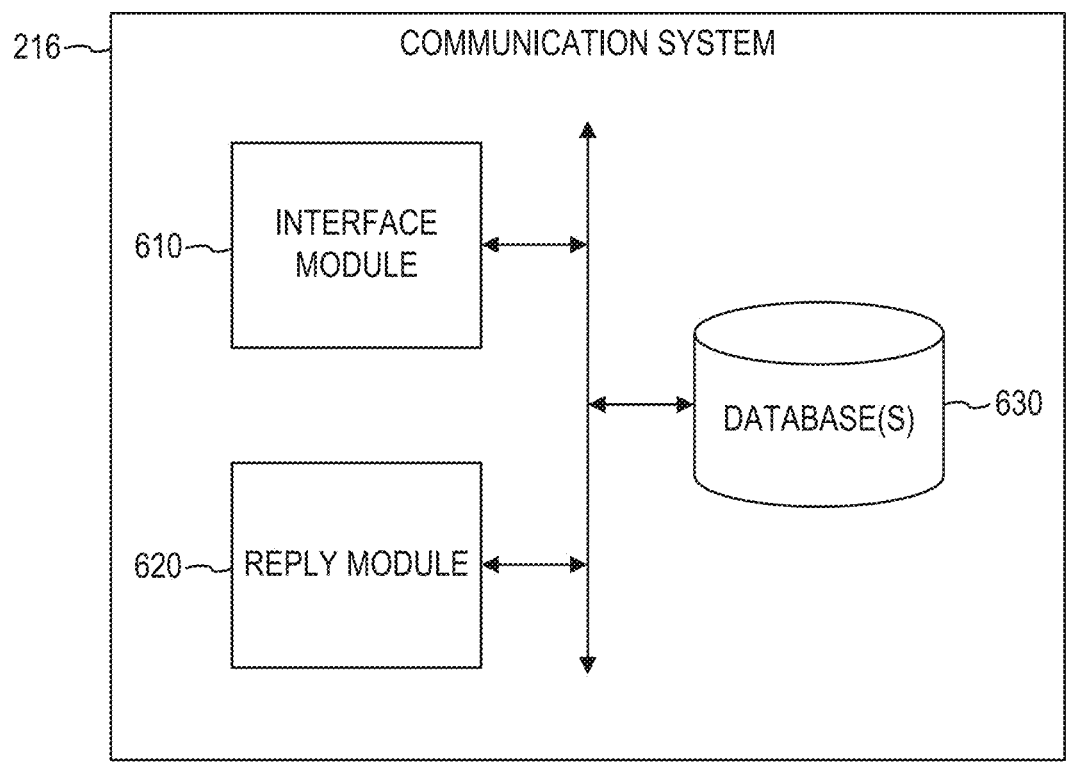
FIG. 6 is a block diagram illustrating a communication system, in accordance with an example embodiment.

FIG. 6 is a block diagram illustrating the communication system 216, in accordance with an example embodiment. In some example embodiments, the communication system 216 comprises any combination of one or more of an interface module 610, a reply module 620, and one or more databases 630. The modules 610 and 620 and the database(s) 330 can reside on a computer system, or other machine, having a memory and at least one processor (not shown).

In some example embodiments, the communication system 216 comprises a remote server. For example, in some embodiments, the modules 610 and 620 and the database(s) 330 are incorporated into the application server(s) 118 in FIG. 1, and the database(s) 330 is incorporated into database(s) 126 in FIG. 1 and can include any combination of one or more of databases 218, 220, and 222 in FIG. 2. In some example embodiments, the communication system 216 comprises a client computing device. For example, in some embodiments, any combination of one or more of the modules 610 and 620 and the database(s) 330 are incorporated into one or more of the client machines 110 and 112 in FIG. 1 or the mobile device 300 in FIG. 3. It is contemplated that other configurations of the modules 610 and 620, as well as the database(s) 630, are also within the scope of the present disclosure.

In some example embodiments, one or more of the modules 610 and 620 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 610 and 620 is configured to receive user input. For example, one or more of the modules 610 and 620 can present one or more GUI elements (e.g., drop-down menu, selectable buttons, text field) with which a user can submit input.

In some example embodiments, one or more of the modules 610 and 620 is configured to perform various communication functions to facilitate the functionality described herein, such as by communicating with the social networking system 210 via the network 104 using a wired or wireless connection. Any combination of one or more of the modules 610 and 620 may also provide various web services or functions, such as retrieving information from the third party servers 130 and the social networking system 210. Information retrieved by the any of the modules 610 and 620 may include profile data corresponding to users and members of the social networking service of the social networking system 210.

Additionally, any combination of one or more of the modules 610 and 620 can provide various data functionality, such as exchanging information with the database(s) 630. For example, any of the modules 610 and 620 can access profile data, social graph data, and member activity and behavior data from the databases 218, 220, and 222 in FIG. 2, as well as exchange information with third party servers 130, client machines 110, 112, and other sources of information.

In some example embodiments, the interface module 610 is configured to detect that a set of one or more messages having content has been transmitted from a first computing device of a first user to a second computing device of a second user. For example, in FIG. 3, the interface module 610 has detected that message 310A or message 310B or both messages 310A and 310B have been transmitted to the first user.

In some example embodiments, the reply module 320 is configured to generate one or more smart replies in response to, or otherwise based on, the detection of the message(s) from the first user to the second user. In some example embodiments, the reply module 620 uses a classification model to predict which replies best match the context in which a suggested reply is to be used (e.g., the conversation thus far, the interlocutors of the conversation, and other pertinent information such as the time of day). However, different users employ different diction and phrasing to express the same idea. Although this variation among users could be incorporated into a single core classification model as, for example, a unique bias term for every individual user, this approach would add a vast number of parameters to the single core classification model (e.g., in a linear model, this would be one weight per user, per possible reply), would require a large amount of training data for each user, and would be neither transparent nor adaptive to product-driven heuristics.

In some example embodiments, the reply module 620 uses a personalization model separate from the core classification model. For each reply R initially selected by the core classification model with probability $P_c(R)$, the reply module 620 finds a possible different personalized reply, R' that has the same or similar meaning. The reply module 620 selects this final R' by computing a probability or score for all possible candidate replies, P(R'), combining the probability given by the core classification model for the original reply, $P_c(R)$, and the personalization model's conditional probability for the final reply R' given the original reply, $P_p(R'|R)$. In some example embodiments, the reply module 620 employs the following combination of the core classification model (e.g., a first model) and the personalization model (e.g., a second model):

$$P(R') = \frac{1}{z} P_c(R) * P_p(R' | R)^w,$$

where w is a weighting exponent that determines the relative importance of the personalization model (e.g., a higher weight corresponds to personalization mattering relatively more) and Z is a normalization term to ensure that all the probabilities of all possible replies sum to 1. In some example embodiments, the personalization model is configured to rely or to otherwise be based on two sources of information: a synonym hierarchy and observations of the replies selected by users.

In some example embodiments, the synonym hierarchy comprises a tree of concepts ranging from the most general root nodes (e.g., gratitude, yes/no answers, conversation openers, etc.) to the most specific leaves, which are the surface forms that are used as the actual smart replies. In some example embodiments, the synonym hierarchy comprises a directed acyclic graph and thus, e.g., a reply with multiple meanings can have multiple parents.

Figure 7:
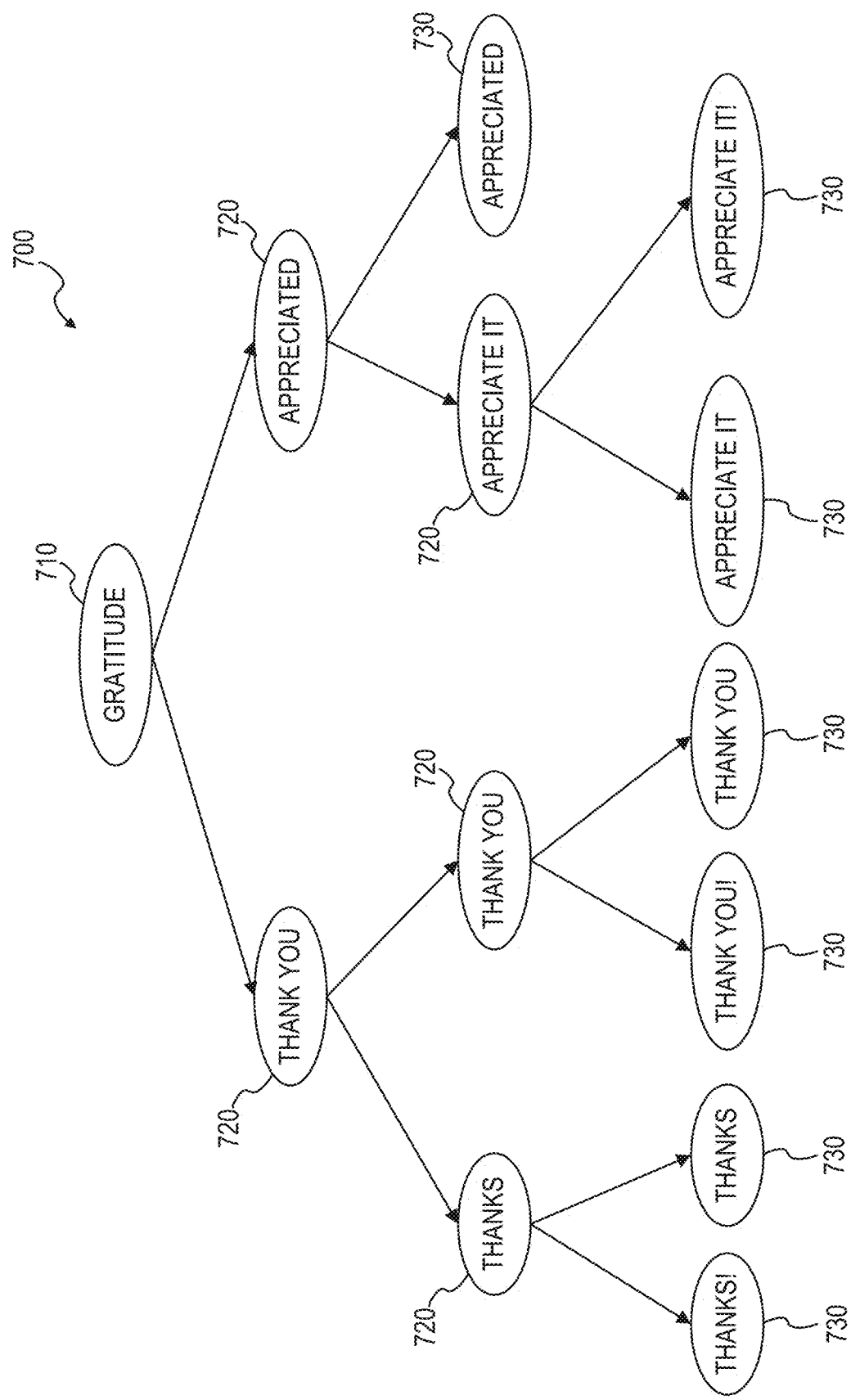
FIG. 7 illustrates a hierarchical graph of synonym replies, in accordance with an example embodiment.

FIG. 7 illustrates a hierarchical graph 700 of synonym replies, in accordance with an example embodiment. The hierarchical graph 700 comprises a root node 710, intermediate nodes 720, and leaf nodes 730. The root node 710 represents a general meaning of gratitude. This general meaning of gratitude has different generalized forms of expression, such as "THANK YOU" and "APPRECIATED", which are represented by intermediate nodes 720. These generalized forms of expression can be divided into more specific levels of expression, which can then be divided into even more specific levels of expression, and so on and so forth, until reaching the leaf nodes 730, which represent the surface forms that are to be considered for use as smart replies, such as "THANKS!", "THANKS", "THANK YOU!", "THANK YOU", "APPRECIATE IT", and "APPRECIATE IT!" in FIG. 7. The leaf nodes 730 are synonyms of each other.

In some example embodiments, the reply module 620 uses a history of the second user's interactions with smart replies to determine which leaf nodes to select for presentation as smart replies to the second user. In some example embodiments, every time smart replies 330 are presented to the second user, the interface module 610 records the instance of such presentation, as well as which, if any, of the smart replies 330 were selected by the second user for inclusion in a reply message to the first user.

In some example embodiments, the reply module 620 is configured to use the synonym hierarchy in conjunction with the history of the user's interactions with smart replies to determine $P_p(R'|R)$. For example, let the number of times user U has selected a reply that is a leaf below a node S in the hierarchy (where S itself may be a leaf, e.g., a surface form/reply, in which case its sole leaf is itself) be $C_U(S)$, and let the number of times the user saw a reply that is a leaf below a node S be $C_N(S)$. Then, in some example embodiments, the reply module 620 uses the following formulation of the personalization model:

$$P_P(R'|R) = \frac{1}{Z} D^{LCA(R,R')} \prod_{i=0}^{n-1} \left( \frac{C_U(R'_i)+L}{C_N(R'_i)+L} \right)^{x_i},$$

where Z is a normalization factor to ensure that $P_p$ is a distribution, D is a [0, 1] discount factor that rewards alternate replies R' that are "closer" to R, LCA( . . . ) is a function that returns the height (measured from the leaf) of the least common ancestor of R and R', and LCA(R, R)=0.

One example of a synonym hierarchy comprises the following path from root to leaf for the reply "Thanks a lot.":

Gratitude (having a level/height=general meaning)→Thank you (having a level/height=metasynset)→Thanks a bunch (having a level/height=synset)→Thanks a lot (having a level/height=near duplicate set)→"Thanks a lot." (having a level/height=surface form/actual reply)

Using this example synonym hierarchy and the example formulation of the personalization model above, if R is "Thanks much" and R' is "Thanks a lot", they do not share an ancestor at height 1 (the near duplicate level), but they do share the "Thanks a bunch" ancestor at height 2 (the synset level). So LCA("Thanks much", "Thanks a lot")=2. This is an exponent on D, and thus results in lower probabilities for personalized replies that have a higher common ancestor (and thus more disparate meaning) relative to the original reply. In some example embodiments, n is the total height of the synonym hierarchy (i iterates over each level of the tree), and $R_i'$ is the ith parent of the personalized reply R' in the synonym hierarchy. For example, $R_0'=R$, and $R_2'$ is the synset of R'. $L_i$ is an additive smoothing constant for each level of the tree i, and X is a log-linear weight that determines the relative importance of the ith layer in the synonym hierarchy. In some example embodiments, rather than finding a log-linear weighted average as in the model above, the reply module 620 instead uses a backoff model: using the user's observed CTR (click-through rate) for R' if the impression and click counts are sufficiently high, and otherwise using the aggregated counts for the parent of R' in the synonym hierarchy (recursing to the next higher level if that aggregated impression count is still insufficient, and so on).

In some example embodiments, the reply module 620 uses the synonym hierarchy to smooth the possibly sparse counts for any given user, similar to ngram backoff and smoothing in neuro-linguistic programming (NLP), and to encourage exploration (e.g., trying smart replies with low impression counts—this is accomplished in the model described above by the additive smoothing constants $L_i$ that give a fixed number of hallucinated clicks and impressions to each reply, which makes low-impression-count replies unduly probable).

In some example embodiments, the reply module 620 is configured to determine a plurality of candidate replies based on the first content of the first set of one or more messages, and then select a plurality of smart replies from the plurality of candidate replies using a hierarchical graph data structure and at least one diversity rule. The hierarchical graph data structure comprises a tree of concepts ranging from a root node to a plurality of leaf nodes with at least one intermediate node in between the root node and each one of the plurality of leaf nodes, and each one of the plurality of candidate replies being represented by a corresponding one of the plurality of leaf nodes in the hierarchical graph data structure, as discussed above with respect to FIG. 7. Since there is often a limited amount of screen space on computing devices for displaying content, particularly with mobile devices, such as smartphones and smartwatches, a technical problem arises in how to most efficiently and effectively make use of the limited screen space. The reply module 620 may use the diversity rule(s) to ensure that a minimum amount of diversity is present in the smart replies 330 that are displayed within the GUI on the display screen 305 of the mobile device 300.

In some example embodiments, each diversity rule is configured to restrict the number of displayed smart replies 330 that have a common parent node or that have some other common relationship with a particular node to being within a specified maximum threshold. For example, one diversity rule may require that no more than two displayed smart replies 330 may have the same parent node. Referring to FIG. 7, this example diversity rule would prevent more than two leaf nodes 730 having the same intermediate node 720 as their parent node from being used as smart replies 330. For example, if an intermediate node 720 had three leaf nodes 730 as its children, the example diversity rule would cause the reply module 620 to select no more than two of the three child leaf nodes 720 of intermediate node 730 for use as smart replies 330. In addition to restrictions based on child-parent relationships, the diversity rules may also place restrictions on other types of relationships between nodes as well, such as a more distant ancestors and descendants (e.g., grandparent-grandchild relationships). In some example embodiments, the reply module 620 is configured to omit at least one of the plurality of candidate replies from selection to be included in the plurality of smart replies 330 based on the diversity rule(s).

In some example embodiments, the interface module 610 is configured to cause each one of the plurality of smart replies 330 to be displayed on the second computing device of the second user as a corresponding selectable user interface element, as discussed above with respect to FIG. 3. In some example embodiments, the reply module 620 is configured to receive a user selection of one of the plurality of smart replies 330 from the second computing device, and then transmit a second message including the selected one of the plurality of smart replies 330 to the first computing device in response to, or otherwise based on, the receiving of the user selection, as discussed above with respect to FIG. 4. In some example embodiments, the reply module 620 is configured to receive a user selection of one of the plurality of smart replies from the second computing device, and then insert the selected one of the plurality of smart replies into a content entry field displayed on the second computing device in response to, or otherwise based on, the receiving of the user selection, as discussed above with respect to FIG. 5.

In some example embodiments, the communication system 216 is configured to store a record of the user selection of the one of the plurality of smart replies in a database, such as in the database(s) 630, and then modify the second model based on the record of the user selection of the one of the plurality of smart replies using one or more machine learning operations. The communication system 216 uses the record of the user selection of the one of the plurality of smart replies as training data in the one or more machine learning operations to modify the second model.

In some instances, a cold-start problem may be encountered: until the user sees some smart replies and clicks on them, there is no information available about the user's preferences regarding smart replies. In order to mitigate this problem, the reply module 620 may rely on one or more groups to which the user belongs. In some example embodiments, the reply module 620 accesses the profile information of the user and the profile information of other users to determine a group of other users who have profile information that has a level of similarity that is determined to satisfy a predetermined similarity threshold. For example, the reply module 620 may analyze the profile information of the user and the other users to determine groups of users who have the same or similar location, have the same or similar age, have the same gender, have the same or similar culture, have the same or similar industry, have profile information embeddings that are within some distance K from the user's profile information embedding, etc.

A user may belong to multiple groups. For each group, the reply module 620 may employ a model $P_p(R'|R)$ as before, but use the user selection data aggregated across all users in the group. In some example embodiments, the model based on the observations for the user U is $P_p^u(R'|R)$, the model for each group G is $P_p^g(R'|R)$, and the new model, smoothed via group membership, is:

$$\frac{1}{Z} P_p^u(R'|R) \prod_g P_p^g(R'|R)^{w_g},$$

where $w_g$ is a per-group weight that controls the relative influence of each group, which may be machine-learned from data. In some alternative example embodiments, the reply module 620 smooths the user selection data over groups directly rather than smoothing the probabilities from per-group models. For example, the reply module 620 may use a weighted sum or backoff on the selection/impression counts (e.g., using a weighted average of the user's own counts and the groups to which they belong).

The reply module 620 may determine whether or not to use the above-discussed group-based model based on a determination of whether or not there is sufficient user selection data for the second user. In some example embodiments, the reply module 620 is configured to, in generating the plurality of smart replies, determine that a number of times the corresponding synonym reply was presented to the second user as a selectable option for replying to messages is below a predetermined threshold (e.g., the predetermined threshold can be one impression instance), and then, based on the determination that the number of times the corresponding synonym reply was presented to the second user is below the predetermined threshold, identify a group of users to which the second user belongs based on a determination that a level of similarity between profile information of the second user and profile information of the group of users satisfies a predetermined similarity threshold. The reply module 620 then generates the plurality of smart replies using the second model based on the plurality of synonym replies and a number of times the group of users has selected the corresponding synonym reply for replying to messages.

Since different computing devices have different display screen sizes, displaying the same number of smart replies on every computing device may cause a technical problem. The screen size of smaller computing devices, such as smartphones or smartwatches, may be insufficient to support the display of the same number of smart replies as on a larger computing device, such as a desktop computer. In order to address this technical problem, in some example embodiments, the reply module 620 is configured to, in generating the plurality of smart replies, limit a number of the smart replies in the plurality of smart replies to no more than a particular number based on a screen size of the second computing device. For example, the reply module 620 may limit the number of smart replies to be displayed on smartphones and smartwatches to no more than three smart replies, while limiting the number of smart replies to be displayed on laptop computers and tablet computers to no more than five smart replies. It is contemplated that other numbers and configurations may be used in limiting the number of smart replies to be displayed.

In some example embodiments, the reply module 620 is configured to select a plurality of smart follow-up content from a plurality of candidate follow-up content in response to the transmitting of the second message including the selected one of the plurality of smart replies to the first computing device. The selecting of the plurality of smart follow-up content is based on at least one of the selected one of the plurality of smart replies and the first content of the first set of one or more messages. In some example embodiments, the reply module 620 is configured to generate the plurality of smart follow-up content by using the same model or a similar model as the model used to generate the smart replies. However, the reply module 620 may feed the selected smart reply into the model in order to generate the plurality of smart follow-up content. In some example embodiments, the reply module 620 does not generate any smart follow-up content in response to input being entered by the second user via the content entry field 320, but rather conditions the generation and display of the smart follow-up content on the second user selecting a smart reply or selecting a smart follow-up. In this respect, the reply module 620 may use only a selected smart reply or a selected smart follow-up content as the trigger and the basis for generating and displaying a smart-follow-up content or an additional smart follow-up content.

In some example embodiments, the reply module 620 selects the plurality of smart follow-up content by determining the plurality of candidate follow-up content based on at least one of the selected one of the plurality of smart replies and the first content of the first set of one or more messages, and then selecting the plurality of smart follow-up content from the plurality of candidate follow-up content using the hierarchical graph data structure and the diversity rule(s), with each one of the plurality of smart follow-up content being represented by a corresponding one of the plurality of leaf nodes in the hierarchical graph data structure. In some example embodiments, the reply module 620 is configured to omit at least one of the plurality of candidate follow-up content from selection to be included in the plurality of smart follow-up content based on the diversity rule(s), where the diversity rule(s) limit a number of the plurality of smart follow-up content that have a common parent node or some other common relationship with a particular node.

In some example embodiments, the interface module 610 is configured to cause each one of the plurality of smart follow-up content to be displayed on the second computing device of the second user as a corresponding selectable user interface element, similar to the display of the selectable user interface elements corresponding to the smart replies. In some example embodiments, the interface module 610 is also configured to receive a user selection of one of the plurality of smart follow-up content from the second computing device, and then transmit a third message including the selected one of the plurality of smart follow-up content to the first computing device in response to receiving the other user selection.

Figure 8:
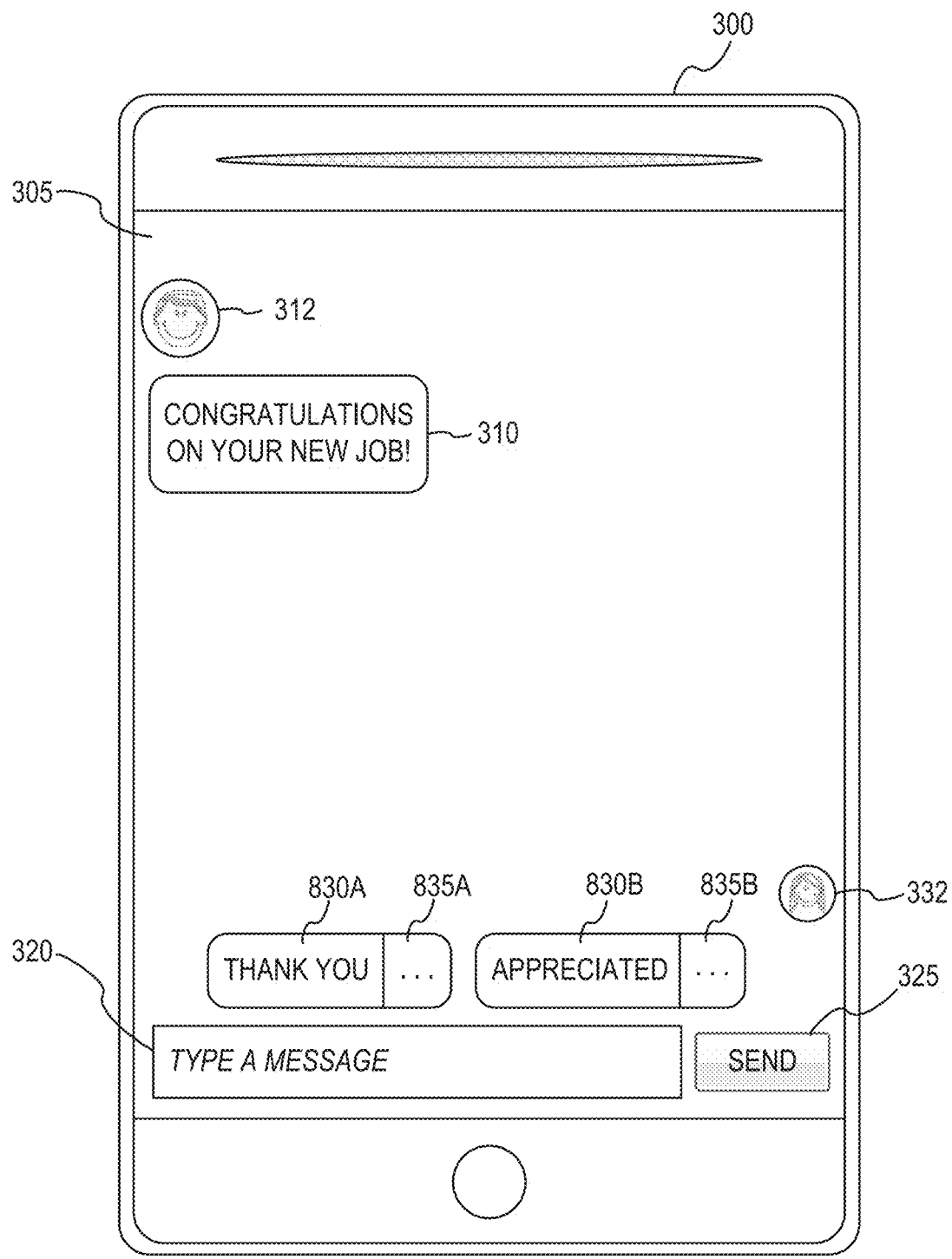
FIG. 8 illustrates generated smart reply categories being displayed as selectable options for replying to messages within a GUI on a display screen of a mobile device, in accordance with an example embodiment.
Figure 9:
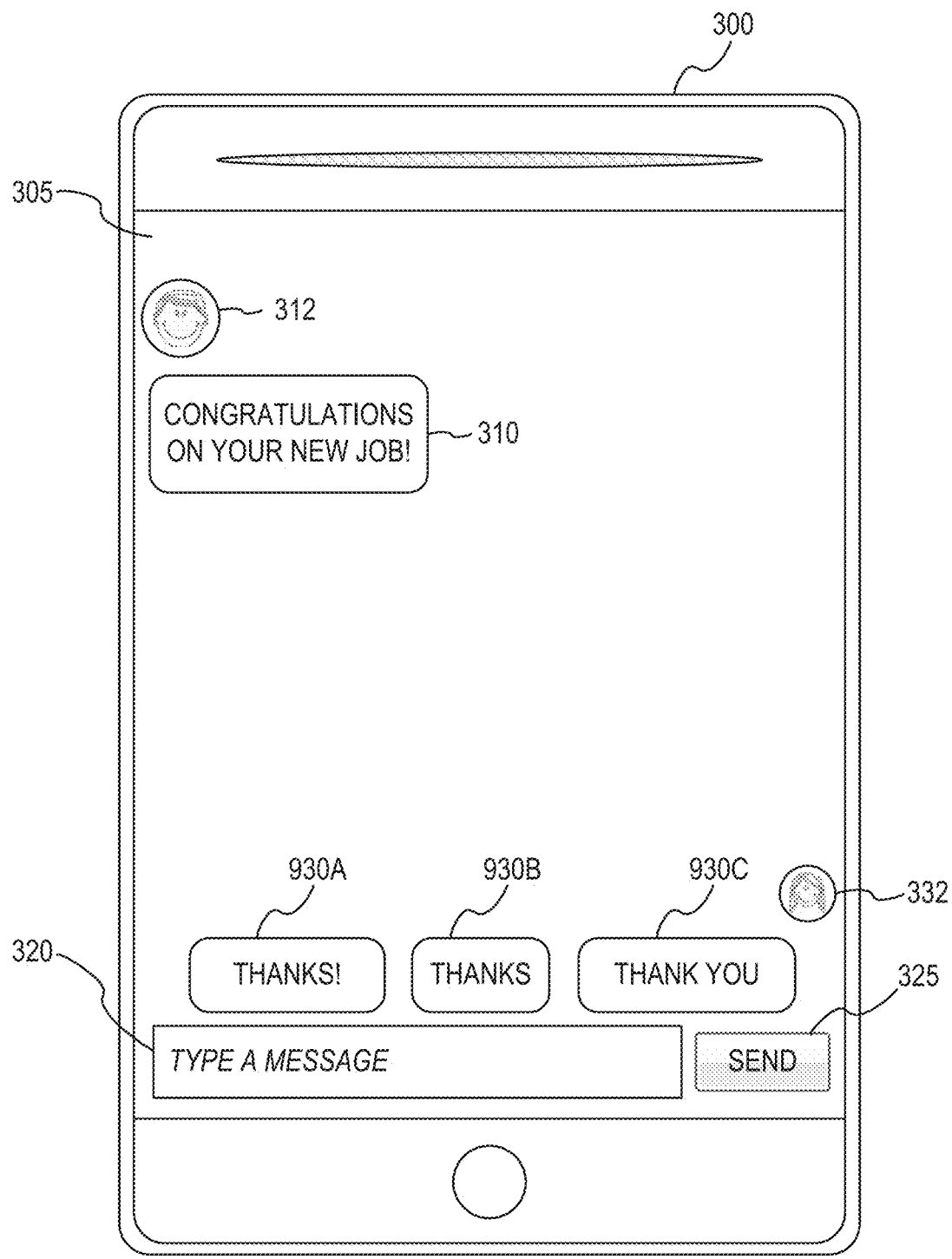
FIG. 9 illustrates a result of one of the generated smart reply categories being selected, in accordance with an example embodiment.

In some example embodiments, in order to conserve screen space while still providing the user with a maximum amount of options for smart replies and smart follow-up content, the interface module 610 is configured to first display the corresponding category concepts of a plurality of intermediate nodes 720 as selectable user interface elements. FIG. 8 illustrates generated smart reply categories 830 being displayed as or along with corresponding selectable options for replying to messages within a GUI on the display screen 305 of the mobile device 300, in accordance with an example embodiment. In FIG. 8, two category concepts 830A and 830B of smart replies are displayed along with corresponding selectable user interface elements 835A and 835B. The corresponding selectable user interface elements 835A and 835B are each configured to, in response to being selected, cause the smart replies 930 corresponding to the child nodes of the intermediate node corresponding to the selected user interface element 835 to be displayed as selectable smart replies. FIG. 9 illustrates a result of one of the selectable user interface elements 835 for the smart reply categories 830 being selected, in accordance with an example embodiment. In the example shown in FIG. 9, the selectable user interface element 835A corresponding to the concept of "THANK YOU" has been selected in FIG. 8, thereby resulting in the expansion of the "THANK YOU" concept into three selectable smart replies 930A, 930B, and 930C that have the same functionality as the selectable smart replies 330A, 330B, and 330C discussed above with respect to FIG. 3.

Figure 10:
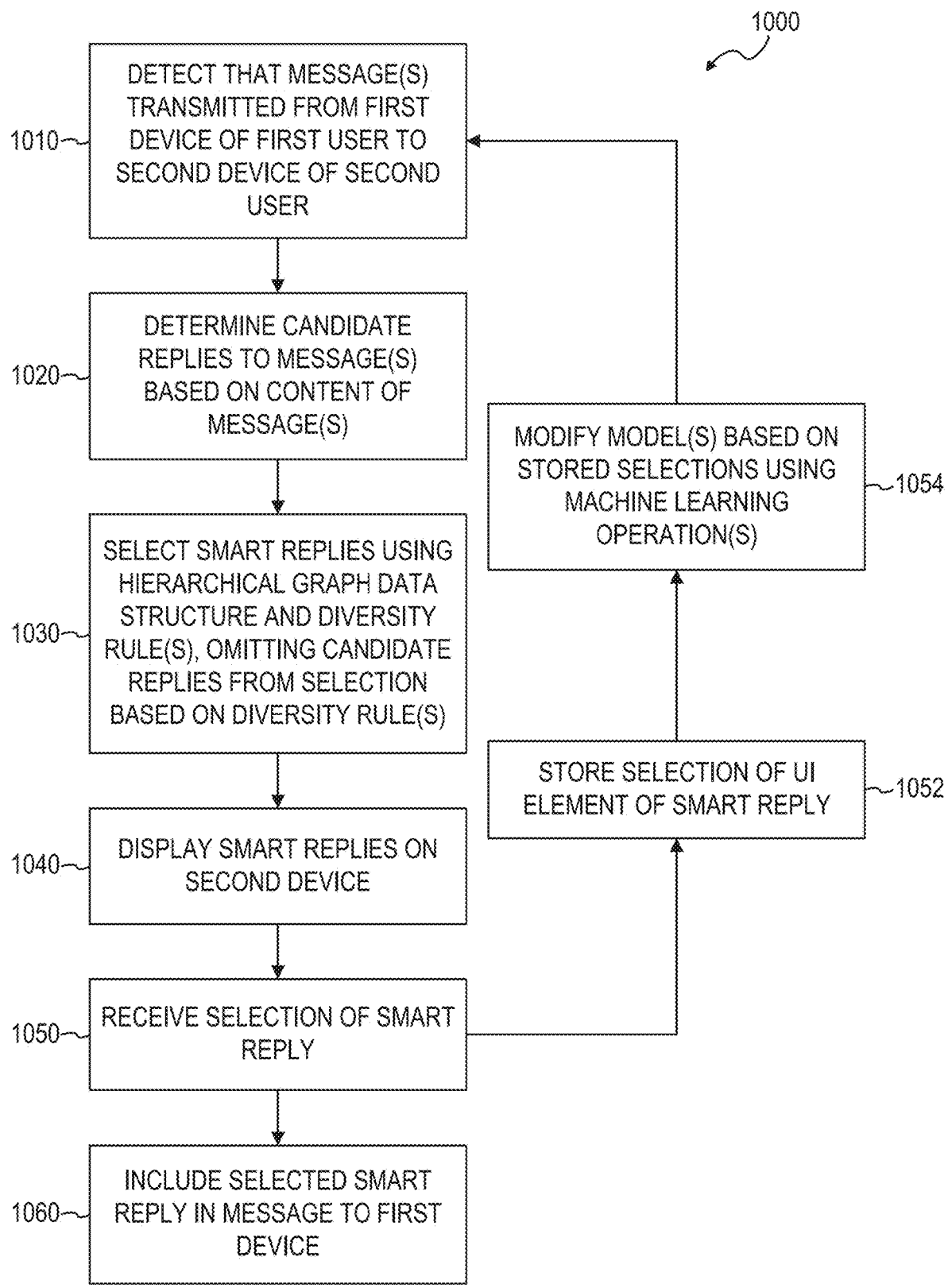
FIG. 10 is a flowchart illustrating a method of generating smart replies, in accordance with an example embodiment.

FIG. 10 is a flowchart illustrating a method 1000 of generating smart replies, in accordance with an example embodiment. The method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the communication system 216 of FIGS. 2-3, as described above.

At operation 1010, the communication system 216 detects that a first set of one or more messages having first content has been transmitted from a first computing device of a first user to a second computing device of a second user. In some example embodiments, the first content of the first set of one or more messages comprises text. However, it is contemplated that other types of content are also within the scope of the present disclosure, including, but not limited to, image-based content (e.g., emojis, GIFs).

At operation 1020, the communication system 216 determines a plurality of candidate replies based on the first content of the first set of one or more messages. In some example embodiments, the communication system 216 searches a database of candidate replies using the first content in order to determine the plurality of candidate replies. For example, the communication system 216 may analyze the first content of the first set of one or more messages using a model to determine that it is a text message expressing "congratulations," and then search the database of candidate replies for candidate replies that have been tagged as being replies to messages expressing "congratulations." However, the communication system 216 may employ other techniques and operations in determining the plurality of candidate replies.

At operation 1030, the communication system 216 selects a plurality of smart replies from the plurality of candidate replies using a hierarchical graph data structure and at least one diversity rule. In some example embodiments, the hierarchical graph data structure comprises a tree of concepts ranging from a root node to a plurality of leaf nodes with at least one intermediate node in between the root node and each one of the plurality of leaf nodes, with each one of the plurality of smart replies being represented by a corresponding one of the plurality of leaf nodes in the hierarchical graph data structure. In some example embodiments, the selecting the plurality of smart replies comprises omitting at least one of the plurality of candidate replies from selection to be included in the plurality of smart replies based on the diversity rule(s), where the diversity rule(s) limit a number of the plurality of smart replies that have a common parent node or some other common relationship with a particular node. In some example embodiments, each one of the plurality of smart replies comprises text. However, it is contemplated that other types of smart replies are also within the scope of the present disclosure, including, but not limited to, image-based content (e.g., emojis, GIFs).

At operation 1040, the communication system 216 causes each one of the selected plurality of smart replies to be displayed on the second computing device of the second user as a corresponding selectable user interface element. For example, the communication system 216 may transmit the selected plurality of smart replies to the second computing device along with instructions to display the selected plurality of smart replies, thereby causing the second computing device to display the selected plurality of smart replies as corresponding selectable user interface elements.

At operation 1050, the communication system 216 receives a user selection of one of the plurality of smart replies from the second computing device. For example, the second user may click or tap on one of the smart replies, and the communication system 216 may receive an indication of the click or tap as the user selection.

At operation 1060, the communication system 216 transmits a second message including the selected one of the plurality of smart replies to the first computing device in response to, or otherwise based on, the receiving of the user selection. For example, the receiving of the user selection may trigger the automatic creation of the second message including the selected smart reply and the automatic transmission of the second message to the first computing device.

At operation 1052, the communication system 216, in response to or otherwise based on the receiving of the user selection at operation 1050, stores a record of the user selection of the one of the plurality of smart replies in a database. At operation 1054, the communication system 216 modifies one or more models used to generate the smart replies based on the record of the user selection of the one of the plurality of smart replies using one or more machine learning operations. In some example embodiments, the record of the user selection of the one of the plurality of smart replies is used as training data in the one or more machine learning operations.

It is contemplated that any of the other features described within the present disclosure can be incorporated into the method 1000.

Figure 11:
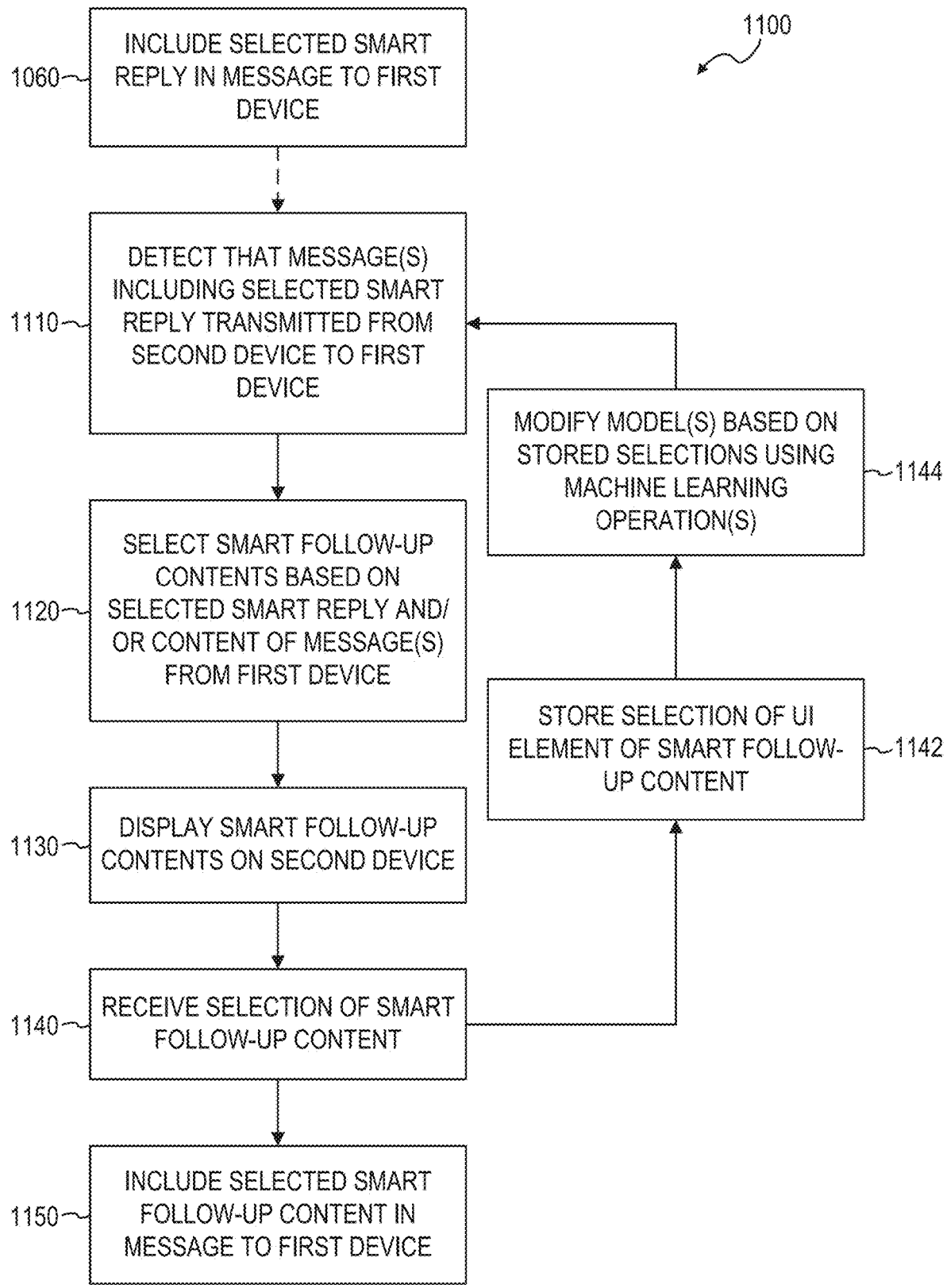
FIG. 11 is a flowchart illustrating a method of generating smart follow-up contents, in accordance with an example embodiment.

FIG. 11 is a flowchart illustrating a method of generating smart follow-up contents, in accordance with an example embodiment. The method 1100 can be performed by processing logic that can comprise hardware (e.g., circuitry, dedicated logic, programmable logic, microcode, etc.), software (e.g., instructions run on a processing device), or a combination thereof. In one implementation, the method 1100 is performed by the communication system 216 of FIGS. 2-3, as described above.

In some example embodiments, operation 1110 performed in response to or otherwise based on operation 1060 of FIG. 10. At operation 1110, the communication system 216 detects that a message that includes a selected smart reply has been transmitted from the second computing device of the second user to the first computing device of the first user.

At operation 1120, the communication system 216 selects a plurality of smart follow-up content from a plurality of candidate follow-up content in response to the transmitting of the second message including the selected one of the plurality of smart replies to the first computing device. In some example embodiments, the selecting of the plurality of smart follow-up content is based on at least one of the selected one of the plurality of smart replies and the first content of the first set of one or more messages. In some example embodiments, the selecting of the plurality of smart follow-up content comprises determining the plurality of candidate follow-up content based on at least one of the selected one of the plurality of smart replies and the first content of the first set of one or more messages, and selecting the plurality of smart follow-up content from the plurality of candidate follow-up content using the hierarchical graph data structure and at least one diversity rule, where each one of the plurality of smart follow-up content is represented by a corresponding one of the plurality of leaf nodes in the hierarchical graph data structure. In some example embodiments, the selecting of the plurality of smart follow-up content comprises omitting at least one of the plurality of candidate follow-up content from selection to be included in the plurality of smart follow-up content based on the diversity rule(s), where the diversity rule(s) limit a number of the plurality of smart follow-up content that have a common parent node or have some other common relationship with a particular node.

At operation 1130, the communication system 216 causes each one of the plurality of smart follow-up content to be displayed on the second computing device of the second user as a corresponding selectable user interface element. For example, the communication system 216 may transmit the plurality of smart follow-up content to the second computing device along with instructions to display the plurality of smart follow-up content, thereby causing the second computing device to display the plurality of smart follow-up content as corresponding selectable user interface elements.

At operation 1140, the communication system 216 receives a user selection of one of the plurality of smart follow-up content from the second computing device. For example, the second user may click or tap on one of the smart follow-up content, and the communication system 216 may receive an indication of the click or tap as the user selection.

At operation 1150, the communication system 216 transmits another message including the selected one of the plurality of smart follow-up content to the first computing device in response to, or otherwise based on, the receiving of the user selection. For example, the receiving of the user selection may trigger the automatic creation of the other message including the selected smart follow-up content and the automatic transmission of the other message to the first computing device.

At operation 1142, the communication system 216, in response to or otherwise based on the receiving of the user selection at operation 1140, stores a record of the user selection of the one of the plurality of smart replies in a database. At operation 1144, the communication system 216 modifies one or more models used to generate the plurality of smart follow-up content based on the record of the user selection of the one of the plurality of smart follow-up content using one or more machine learning operations. In some example embodiments, the record of the user selection of the one of the plurality of smart follow-up content is used as training data in the one or more machine learning operations.

It is contemplated that any of the other features described within the present disclosure can be incorporated into the method 1000.

Example Mobile Device

Figure 12:
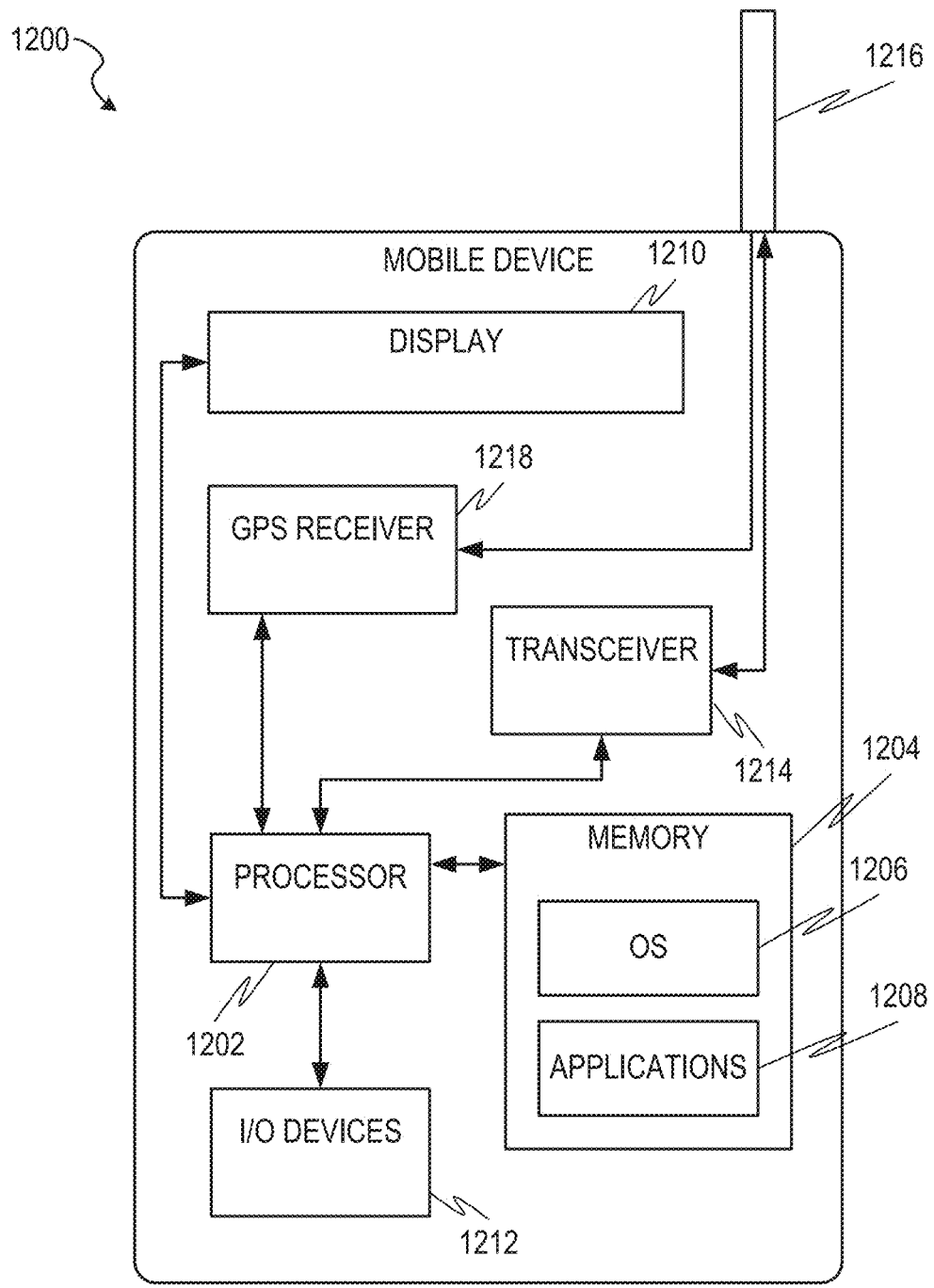
FIG. 12 is a block diagram illustrating a mobile device, in accordance with some example embodiments.

FIG. 12 is a block diagram illustrating a mobile device 1200, according to an example embodiment. The mobile device 1200 can include a processor 1202. The processor 1202 can be any of a variety of different types of commercially available processors suitable for mobile devices 1200 (for example, an XScale architecture microprocessor, a Microprocessor without Interlocked Pipeline Stages (MIPS) architecture processor, or another type of processor). A memory 1204, such as a random access memory (RAM), a Flash memory, or other type of memory, is typically accessible to the processor 1202. The memory 1204 can be adapted to store an operating system (OS) 1206, as well as application programs 1208, such as a mobile location-enabled application that can provide location-based services (LBSs) to a user. The processor 1202 can be coupled, either directly or via appropriate intermediary hardware, to a display 1210 and to one or more input/output (I/O) devices 1212, such as a keypad, a touch panel sensor, a microphone, and the like. Similarly, in some embodiments, the processor 1202 can be coupled to a transceiver 1214 that interfaces with an antenna 1216. The transceiver 1214 can be configured to both transmit and receive cellular network signals, wireless data signals, or other types of signals via the antenna 1216, depending on the nature of the mobile device 1200. Further, in some configurations, a GPS receiver 1218 can also make use of the antenna 1216 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
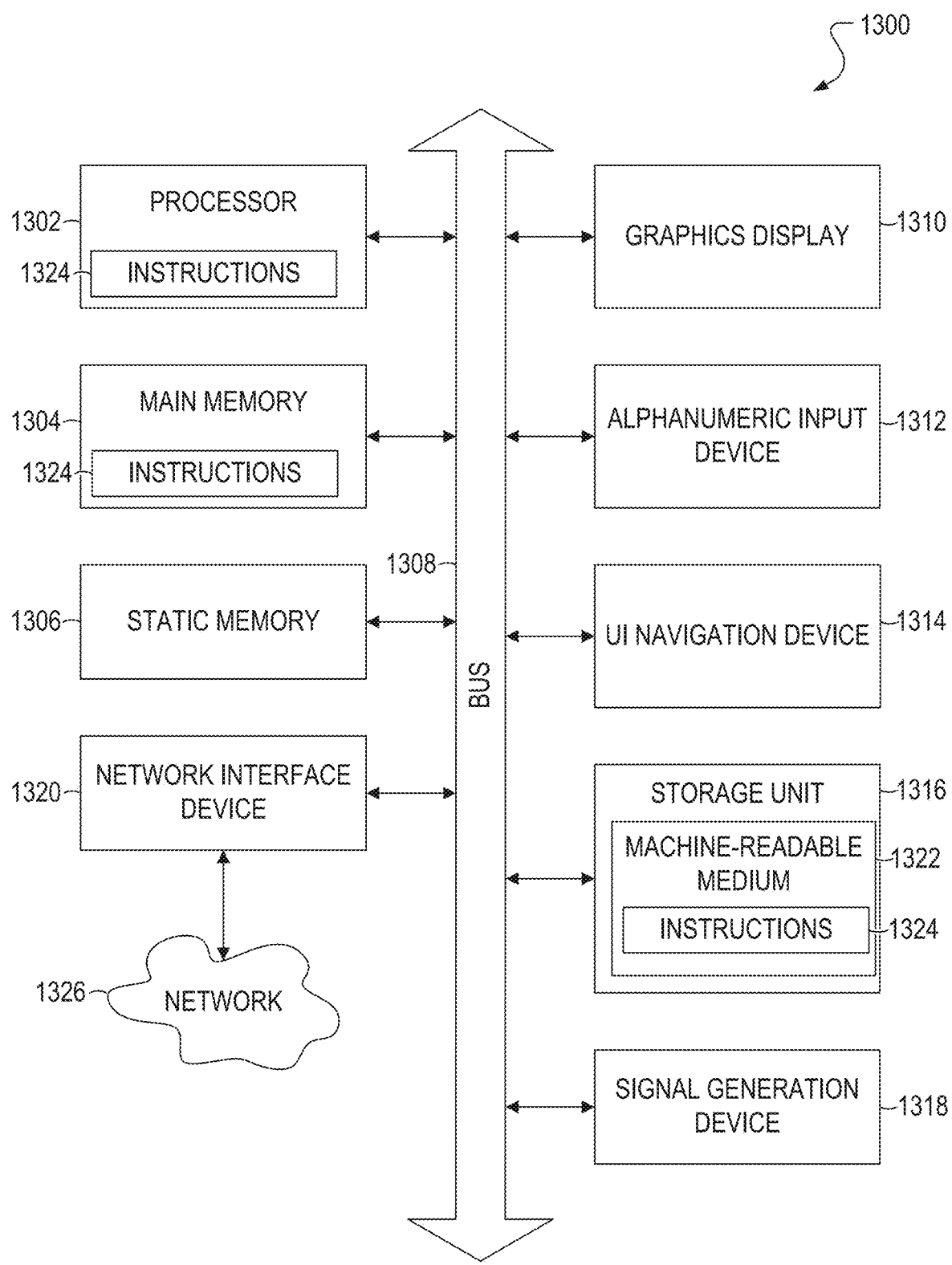
FIG. 13 is a block diagram of an example computer system on which methodologies described herein may be executed, in accordance with an example embodiment.

FIG. 13 is a block diagram of an example computer system 1300 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a graphics display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation device 1314 (e.g., a mouse), a storage unit 1316, a signal generation device 1318 (e.g., a speaker) and a network interface device 1320.

Machine-Readable Medium

The storage unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions (e.g., instructions 1324) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   detecting, by a computer system comprising a memory and at least one hardware processor, that a first set of one or more messages having first content has been transmitted from a first computing device of a first user to a second computing device of a second user;
   selecting, by the computer system, a plurality of category concepts based on the first content of the first set of one or more messages using a hierarchical graph data structure, the hierarchical graph data structure comprising a tree of concepts ranging from a root node to a plurality of leaf nodes with at least one intermediate node in between the root node and each one of the plurality of leaf nodes, each one of the plurality of category concepts being represented by a corresponding intermediate node in the hierarchical graph data structure;
   causing, by the computer system, each one of the plurality of category concepts to be displayed on the second computing device of the second user as a corresponding selectable user interface element;
   receiving, by the computer system, a first user selection of the corresponding selectable user interface element of one of the plurality of category concepts from the second computing device; and
   causing, by the computer system, a plurality of smart replies to be displayed on the second computing device in response to the user selection of the corresponding selectable user interface element of the one of the plurality of category concepts, the plurality of smart replies corresponding to leaf nodes of the intermediate node that corresponds to the one of the plurality of category concepts in the hierarchical graph data structure.

2. The computer-implemented method of claim 1, further comprising:
   receiving, by the computer system, a second user selection of one of the plurality of smart replies from the second computing device from the second computing device; and
   transmitting, by the computer system, a second message including the selected one of the plurality of smart replies to the first computing device in response to the receiving of the second user selection.

3. The computer-implemented method of claim 1, wherein the causing the plurality of smart replies to be displayed on the second computing device comprises:
   determining a plurality of candidate replies based on the first content of the first set of one or more messages; and
   selecting the plurality of smart replies from the plurality of candidate replies, the selecting the plurality of smart replies comprising omitting at least one of the plurality of candidate replies from selection to be included in the plurality of smart replies based on at least one diversity rule, the at least one diversity rule limiting a number of the plurality of smart replies that have a common parent node, wherein the causing the plurality of smart replies to be displayed on the second computing device is based on the selecting of the plurality of smart replies from the plurality of candidate replies.

4. The computer-implemented method of claim 1, wherein the first content of the first set of one or more messages comprises text.

5. The computer-implemented method of claim 1, wherein each one of the plurality of smart replies comprises text.

6. The computer-implemented method of claim 1, wherein the computer system comprises a remote server.

7. The computer-implemented method of claim 1, wherein the computer system comprises the second computing device.

8. A computer system comprising:
at least one hardware processor; and
a non-transitory machine-readable medium embodying a set of instructions that, when executed by the at least one hardware processor, cause the at least one processor to perform operations, the operations comprising:
detecting that a first set of one or more messages having first content has been transmitted from a first computing device of a first user to a second computing device of a second user;
selecting a plurality of category concepts based on the first content of the first set of one or more messages using a hierarchical graph data structure, the hierarchical graph data structure comprising a tree of concepts ranging from a root node to a plurality of leaf nodes with at least one intermediate node in between the root node and each one of the plurality of leaf nodes, each one of the plurality of category concepts being represented by a corresponding intermediate node in the hierarchical graph data structure;
causing each one of the plurality of category concepts to be displayed on the second computing device of the second user as a corresponding selectable user interface element;
receiving a first user selection of the corresponding selectable user interface element of one of the plurality of category concepts from the second computing device; and
causing a plurality of smart replies to be displayed on the second computing device in response to the user selection of the corresponding selectable user interface element of the one of the plurality of category concepts, the plurality of smart replies corresponding to leaf nodes of the intermediate node that corresponds to the one of the plurality of category concepts in the hierarchical graph data structure.

9. The system of claim 8, wherein the operations further comprise:
receiving a second user selection of one of the plurality of smart replies from the second computing device from the second computing device; and
transmitting a second message including the selected one of the plurality of smart replies to the first computing device in response to the receiving of the second user selection.

10. The system of claim 8, wherein the causing the plurality of smart replies to be displayed on the second computing device comprises:

determining a plurality of candidate replies based on the first content of the first set of one or more messages; and selecting the plurality of smart replies from the plurality of candidate replies, the selecting the plurality of smart replies comprising omitting at least one of the plurality of candidate replies from selection to be included in the plurality of smart replies based on at least one diversity rule, the at least one diversity rule limiting a number of the plurality of smart replies that have a common parent node, wherein the causing the plurality of smart replies to be displayed on the second computing device is based on the selecting of the plurality of smart replies from the plurality of candidate replies.

11. The system of claim 8, wherein the first content of the first set of one or more messages comprises text.

12. The system of claim 8, wherein each one of the plurality of smart replies comprises text.

13. The system of claim 8, wherein the computer system comprises a remote server.

14. The system of claim 8, wherein the computer system comprises the second computing device.

15. A non-transitory machine-readable medium embodying a set of instructions that, when executed by at least one hardware processor, cause the processor to perform operations, the operations comprising:
detecting, by a computer system comprising the at least one hardware processor, that a first set of one or more messages having first content has been transmitted from a first computing device of a first user to a second computing device of a second user;
selecting, by the computer system, a plurality of category concepts based on the first content of the first set of one or more messages using a hierarchical graph data structure, the hierarchical graph data structure comprising a tree of concepts ranging from a root node to a plurality of leaf nodes with at least one intermediate node in between the root node and each one of the plurality of leaf nodes, each one of the plurality of category concepts being represented by a corresponding intermediate node in the hierarchical graph data structure;
causing, by the computer system, each one of the plurality of category concepts to be displayed on the second computing device of the second user as a corresponding selectable user interface element;
receiving, by the computer system, a first user selection of the corresponding selectable user interface element of one of the plurality of category concepts from the second computing device; and
causing, by the computer system, a plurality of smart replies to be displayed on the second computing device in response to the user selection of the corresponding selectable user interface element of the one of the plurality of category concepts, the plurality of smart replies corresponding to leaf nodes of the intermediate node that corresponds to the one of the plurality of category concepts in the hierarchical graph data structure.

16. The non-transitory machine-readable medium of claim 15, wherein the operations further comprise:
receiving, by the computer system, a second user selection of one of the plurality of smart replies from the second computing device from the second computing device; and transmitting, by the computer system, a second message including the selected one of the plurality of smart replies to the first computing device in response to the receiving of the second user selection.

17. The non-transitory machine-readable medium of claim 15, wherein the causing the plurality of smart replies to be displayed on the second computing device comprises:
   determining a plurality of candidate replies based on the first content of the first set of one or more messages; and
   selecting the plurality of smart replies from the plurality of candidate replies, the selecting the plurality of smart replies comprising omitting at least one of the plurality of candidate replies from selection to be included in the plurality of smart replies based on at least one diversity rule, the at least one diversity rule limiting a number of the plurality of smart replies that have a common parent node,
   wherein the causing the plurality of smart replies to be displayed on the second computing device is based on the selecting of the plurality of smart replies from the plurality of candidate replies.

18. The non-transitory machine-readable medium of claim 15, wherein the first content of the first set of one or more messages comprises text.

19. The non-transitory machine-readable medium of claim 15, wherein each one of the plurality of smart replies comprises text.

20. The non-transitory machine-readable medium of claim 15, wherein the computer system comprises a remote server.

* * * * *

UNITED STATES PATENT AND TRADEMARK OFFICE
CERTIFICATE OF CORRECTION

PATENT NO. : 11,334,714 B2
APPLICATION NO. : 17/352978
DATED : May 17, 2022
INVENTOR(S) : Pasternack et al.

Page 1 of 1

It is certified that error appears in the above-identified patent and that said Letters Patent is hereby corrected as shown below:

In the Claims

In Column 22, Lines 51-52, in Claim 2, delete "second computing device from the second computing device;" and insert --second computing device;-- therefor In Column 23, Lines 59-60, in Claim 9, delete "second computing device from the second computing device;" and insert --second computing device;-- therefor In Column 24, Lines 66-67, in Claim 16, delete "second computing device from the second computing device;" and insert --second computing device;-- therefor Signed and Sealed this
Twelfth Day of July, 2022

Katherine Kelly Vidal
*Director of the United States Patent and Trademark Office*